Oct. 12, 1943.   L. A. OESCHGER   2,331,719
PICK-OFF ATTACHMENT FOR AUTOMATIC SCREW MACHINES
Filed Dec. 27, 1940
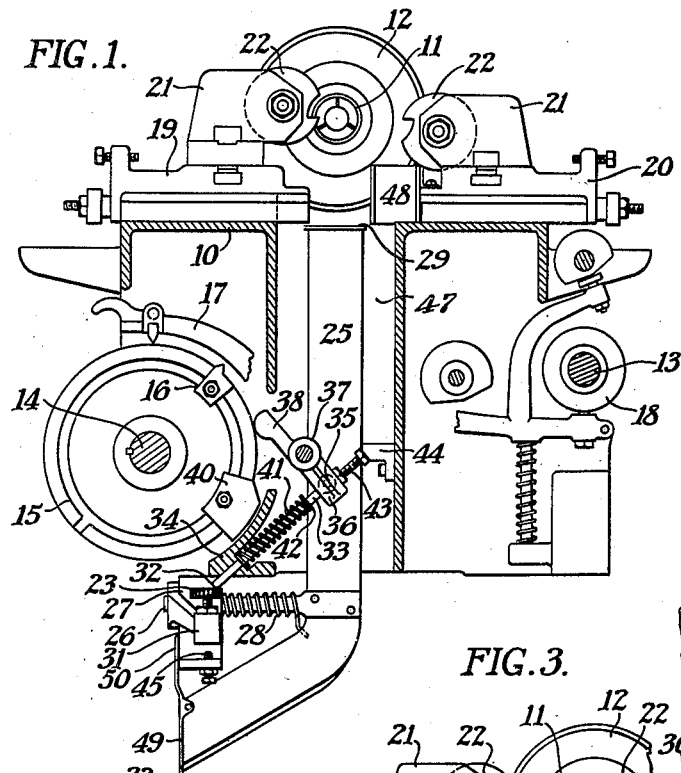
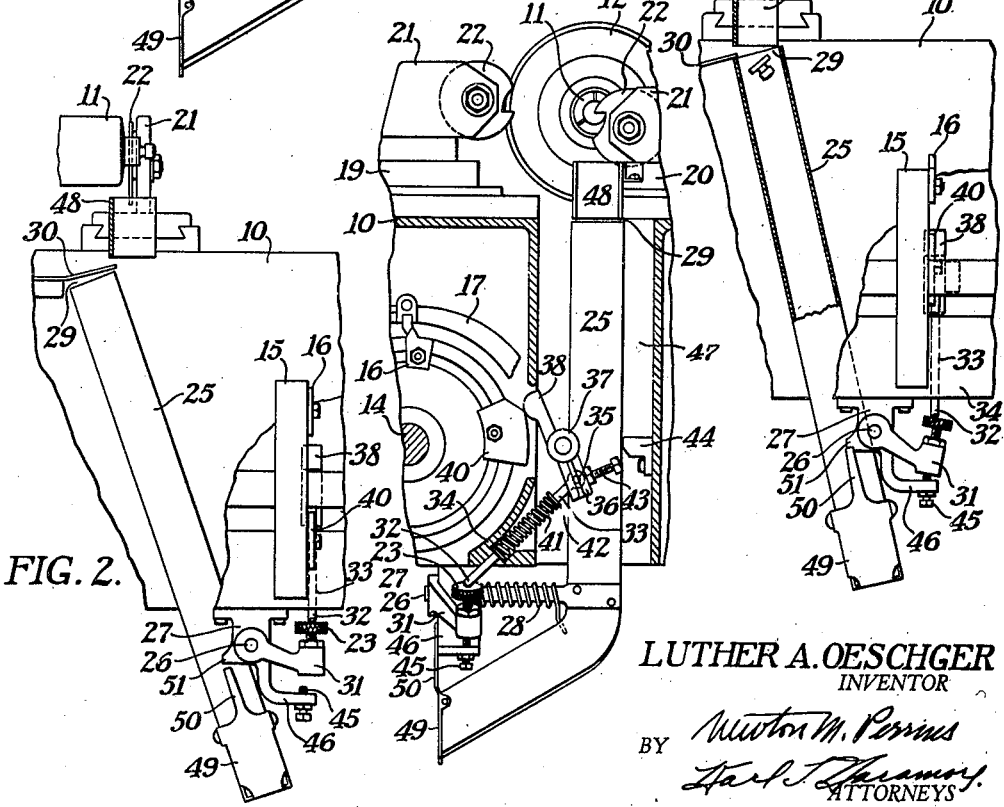
LUTHER A. OESCHGER
INVENTOR
BY Newton M. Perkins
Karl S. Haramon
ATTORNEYS Patented Oct. 12, 1943

2,331,719

UNITED STATES PATENT OFFICE 2,331,719

PICK-OFF ATTACHMENT FOR AUTOMATIC SCREW MACHINES

Luther A. Oeschger, Rochester, N. Y., assignor to Eastman Kodak Company, Rochester, N. Y., a corporation of New Jersey Application December 27, 1940, Serial No. 371,946

6 Claims. (Cl. 164—36)

The present invention relates to automatic screw machines, and particularly to a work pick-off attachment for use therewith.

It is common practice in machines of this type to permit the finished piece of work after being cut off to fall through an opening in the bed of the machine and into the tank table which collects the oil which is continuously pumped onto the tool of the machine during the cutting operation. Inasmuch as the tank table is located quite a distance from the chuck of the machine, the cut-off piece is subjected to an impact which is sometimes sufficient to mar the surface thereof. The result of such impact is ofttimes sufficient to spoil a piece which has been provided with a finished surface, or may be sufficient to spoil the threads on a piece which has been given a final threading operation.

Therefore, one object of the present invention is to provide a pick-off attachment for an automatic screw machine which will guide the cut-off piece to the tank table of the machine, or other collecting receptacle, remote from the chuck, in such a way that the piece will not be subjected to impact or any other force which might injure the surface thereof.

Another object is to provide a pick-off attachment of the type set forth which comprises an open ended chute, preferably made of a material softer than the stock being cut on the machine, and so located on the machine that one of its open ends is located adjacent the chuck of the machine, while its other open end is adapted to extend to a collecting receptacle remote from the chuck of the machine.

And yet another object is to provide a chute which is mounted on the frame of the machine to move between an operative position, wherein its entrance is located directly below the chuck of the machine to receive a piece of work at cut off, and an inoperative position, wherein its entrance is removed from beneath said chuck so that the chips during the cutting operation do not fall thereinto.

A further object is to so mount said chute that it is normally moved to its inoperative position, and automatically moved to its operative position by a trip dog on one of the dog carriers of the machine just before the cut-off tool finishes its cut-off operation.

And yet another object is to provide means in said chute for breaking the fall of the cut-off piece therethrough to reduce to a minimum the impact to which said piece might be subjected.

Another object is to provide means for breaking the fall of the cut-off piece through the chute, and which means comprises a door at the exit of the chute which is normally closed but is adapted to be opened by the weight of the piece thereagainst, and which door is adapted to be positively held closed during the time the chute is in its operative position and automatically released when the chute moves to its inoperative position.

And yet another object is to provide a pick-off attachment of the type set forth which is cheap to manufacture, simple and effective in operation, and of such a nature that it can be readily attached to any existing machine for use at such times as pieces are being machined that it is desired to protect against damage which might result from impact when the piece falls to the tank table or other receiving receptacle.

The novel features that I consider characteristic of my invention are set forth with particularity in the appended claims. The invention itself, however, both as to its organization and its methods of operation, together with additional objects and advantages thereof, will best be understood from the following description of a specific embodiment when read in connection with the accompanying drawing in which, Fig. 1 is a transverse section taken through a well-known type of automatic screw machine just in front of the tool post and looking toward the chuck, and showing a preferred embodiment of my pick-off attachment operatively connected thereto, and in an inoperative position, Fig. 2 is a side elevation of the part of the machine shown in Fig. 1, and showing the pick-off attachment in an inoperative position, Fig. 3 is a partial transverse section corresponding to that of Fig. 1, and showing the pick-off attachment in an operative position, and Fig. 4 is a side elevation, partially in section, of the pick-off attachment and its operating means, and corresponding to Fig. 3.

Like reference characters refer to corresponding parts throughout the drawing.

Referring to the drawing, a well-known type of automatic screw machine, for use on which my novel pick-off attachment is adapted, may comprise a bed 10 on which is mounted a spring collet or chuck 11 for holding the bar stock to be worked upon, and which chuck may be driven by a friction pulley 12 connected to a source of power by a belt, not shown. Extending along the rear side of the bed 10 is a driving shaft 13 on which may be mounted, or connected to it, a number of cams, gears, and clutches for automatically performing the operations of advancing the bar stock through the machine spindle for each new piece, reversing the rotation of the spindle, indexing the turret around, and automatically changing the spindle speed, as is well known to those skilled in the art. Extending along the front of the bed 10 is a cross slide cam shaft 14 which is adapted to be driven from the driving shaft 13 through change gears and bevel and worm gearing, not shown. One or more dog carriers 15 mounted on the cam shaft 14 carry adjustable trip dogs 16 attached at their edges. As the cam shaft rotates, these trip dogs engage pivoted trip levers, such as 17 shown, which extend through the bed, causing the lever to throw in clutches, such as 18, on the driving shaft. In this manner the trip dogs on the carrier may be set to start the turret indexing mechanism, or to trip the clutches that drive the cams for opening and closing the chuck, and advancing the bar stock, and reversing and changing the speed of the spindle, as is well known.

The bed of the machine is provided with a vertical opening 47 below the chuck of the machine and through which the work after being cut off usually is allowed to fall to the tank table or other receiving receptacle, not shown. The front and back cross slides 19 and 20, respectively, are mounted on the bed 10 on opposite sides of the chuck 11 to slide transversely of the bed, and are automatically moved in timed relation by disk cams, not shown, on the cam shaft. To each of these slides is attached a tool post 21 carrying a tool 22. The tool carried by the back cross slide is usually the cut-off tool, and which tool serves to cut off the finished piece when the cross slide moves across the chuck.

The machine, and the parts thereof, described up to this point form no part of the present invention except insofar as they cooperate with my novel pick-off attachment now to be set forth in detail. Since automatic screw machines of the type in question are well known in the art, and the mechanism thereof necessary to the operation of my invention is adequately set forth above, it is believed that the details of such a machine need not be further elaborated on in this specification.

Coming now to the present invention, my novel pick-off attachment may comprise an open ended elongated chute 25 pivotally mounted on the bed 10 of the machine to move between an operative position, see Figs. 3 and 4, wherein its entrance 29 extends from a point adjacent, and vertically below, the chuck 11 of the machine to collect the pieces of work as they are cut off, to an inoperative position, see Figs. 1 and 2, wherein its entrance 29 is removed from below the chuck and so that chips will not pass into the same. The chute is preferably made of wood so that impact between the same and the cut-off piece will not injure the surface of the piece; or said chute might be made of any material softer than the metal stock, for example hard rubber, plastic, etc.

For pivotally mounting the chute 25 on the bed 10 of the machine said chute 25 may have attached thereto a transversely extending rod 26 the free end of which is adapted to be rotatably mounted in the bearing 27 attached to the bed 10. A coil spring 28, surrounding the rod 26, normally pivots the chute 25 to its inoperative position, shown in Figs. 1 and 2, and in which position the open entrance 29 of the chute is removed from beneath the chuck and moved under a shield 30 attached to the bed 10, said shield serving to prevent any machine chips from passing into the chute. To the end of the rod 26 extending beyond the bearing 27 is fixed an arm 31 which includes an adjusting screw 23. One end 32 of a rod 33, slidably extending through an aperture in the portion 34 of the bed 10, normally engages the head of the adjusting screw 23. This rod 33 is pivoted at its other end 35 to an arm 36 of the pivoted crank 37, the other end 38 of which crank is adapted to be engaged by a cam member 40 attached to the edge of the dog carrier 15. The crank is normally moved counter-clockwise by a compression spring 41 encircling the rod 33 and held under compression between a flange 42 thereon and portion 34 of the bed 10.

The rod 33 is normally moved away from the adjusting screw 23 by the compression spring 41 to permit the chute 25 to be normally moved to its inoperative position by the coil spring 28, see Figs. 1 and 2. At the same time, the crank 37 is moved counterclockwise to bring the end 38 thereof into the path of the cam member 40 on the carrier 15. It goes without saying that the cam member 40 does not occupy the same plane as the trip dog on the carrier, and the normal position of the crank may be determined by the engagement of an adjustable stop pin 43 carried by the arm 36 thereof with a stop lug 44 fixed to the bed 10. The extent of movement of the chute clockwise to its operative position is limited by the engagement between an adjustable stop screw 45 threaded to the bracket 46 on the bearing 27 with the end of the arm 31.

The cam member 40 is so located on the carrier 15 that it will engage the crank 37 to move the chute to its operative position at substantially the instant the back cross slide 20 moves to a point where the cut-off tool carried thereby finishes its cut-off operation. The high point of the cam member 40 is sufficiently long to maintain the chute in its operative position as long as necessary, but is adapted to permit the chute to return to its inoperative position before the machining operation starts on a subsequent piece of stock. By referring to Fig. 1 it will be appreciated that the entrance of the chute 25 must terminate just below the cross slides 19 and 20, due to the fact that the slides must move transversely thereof, thus leaving a space between the entrance of the chute and the chuck 11. In order to obtain the effect and result of a chute extending clear up to the chuck, I mount a trough 48 on the front end of the back cross slide. This trough is substantially the same size and shape in cross section as the entrance of the chute and is brought into alignment with the end of the chute when the cross slide reaches its full cut-off position, see Fig. 3, so as to, in effect, form a part of the chute to guide the pieces cut off from the chuck to the chute proper.

It is desirable to break the fall of the cut-off piece in the chute before it reaches the tank table, or other receiving receptacle, not shown, to thereby reduce, to a minimum, the impact which the cut-off piece might be subjected to in falling to said receiving member. To this end, I provide the exit of the chute with a hinged door 49. This door 49 is preferably connected to the chute so that it will be normally closed, but may be opened by the weight of a piece of work lying against the same when it is not positively held closed. I have shown the door merely pivoted to the end of the chute in such a way that the weight of the door itself will normally hold it in its closed position, but it will be readily appreciated that a light spring could be mounted to act at the pivot of the door to hold the same closed if so desired. The door 49 includes a projecting arm 50 which is adapted to engage projection 51 on the bearing 27 when the chute is moved to its operative position, whereby the door is positively held in a closed position to stop a cut-off piece when falling against the same. When the chute swings to its normal inoperative position the arm 50 is removed from engagement with the projection 51 and the weight of the cut-off piece in the chute is sufficient to open the door to permit the piece to fall into the receiving receptacle. By this arrangement the fall of a cut-off piece is effectively broken so that the same is saved from what might otherwise be an impact injurious to its machined exterior.

It will be readily appreciated from the above description that I have provided a pick-off attachment for automatic screw machines which protects the cut-off piece from injurious impact incident to its drop from the chuck to the receiving receptacle. The pick-off attachment, although simple in construction, is efficient in operation, and can be readily detachably mounted to any existing machines for use when desired. The door at the exit of the chute positively breaks the fall of the cut-off piece when the chute is in its operative position and releases the piece when the chute moves to its inoperative position. The particular arrangement of the chute prevents machining chips from entering the chute where they might damage the machine surface of the piece if such piece came in forcible contact therewith. For example, if a piece having a finished thread on its exterior fell into forceful contact with a number of machining chips it is quite possible that one of said chips would be jammed into the grooves of the threads to the extent that the same could not be removed without damaging said threads.

Although I have shown and described a certain specific embodiment of my invention, I am fully aware that many modifications thereof are possible. My invention therefore is not to be restricted except insofar as necessitated by the scope of the appended claims.

Having thus described my invention, what I claim as new and desire to secure by Letters Patent of the United States is:

1. In a machine of the type described the combination with a machine bed, a chuck rotatably mounted on said bed, a cross slide mounted on said bed to reciprocate transversely of said chuck, a cut-off tool carried by said cross slide, driving means for said chuck and cross slide, control means for periodically connecting said cross slide to said driving means to cut off a piece of work held by said chuck, of a pick-off attachment for directing said piece cut off by said cut-off tool to a point remote from said chuck without injury to said piece, said pick-off attachment comprising an elongated chute having an open entrance and an exit, a cover for said chute, means for mounting said chute on said bed to move from an operative position, wherein its entrance is disposed vertically below and adjacent said chuck, and an inoperative position, wherein its entrance is removed from below said chuck and is closed by said cover, means normally moving said chute to its inoperative position, means for automatically moving said chute to its operative position at the instant said cut-off tool finishes its cut-off stroke, and means on said chute for momentarily arresting the fall of said cut-off piece therethrough.

2. In a machine of the type described the combination with a machine bed, a chuck rotatably mounted on said bed, a cross slide mounted on said bed to reciprocate transversely of said chuck, a cut-off tool carried by said cross slide, driving means for said chuck and cross slide, control means for periodically connecting said cross slide to said driving means to cut off a piece of work held by said chuck, of a pick-off attachment for directing said piece cut off by said cut-off tool to a point remote from said chuck without injury to said piece, said pick-off attachment comprising an elongated chute having an open entrance and an exit, means for mounting said chute on said bed to move from an operative position, wherein its entrance is disposed vertically below and adjacent said chuck, and an inoperative position, wherein its entrance is removed from below said chuck and is covered, means normally moving said chute to its inoperative position, means for automatically moving said chute to its operative position at the instant said cut-off tool finishes its cut-off stroke, means on said chute for arresting the fall of said cut-off piece and holding it during the time said chute is in its operation position, and adapted to release said piece when said chute is moved to its inoperative position.

3. In a machine of the type described the combination with a machine bed, a chuck rotatably mounted on said bed, a cross slide mounted on said bed to reciprocate transversely of said chuck, a cut-off tool carried by said cross slide, driving means for said chuck and cross slide, control means for periodically connecting said cross slide to said driving means to cut off a piece of work held by said chuck, of a pick-off attachment for directing said piece cut off by said cut off tool to a point remote from said chuck without injury to said piece, said pick-off attachment comprising an elongated chute having an open entrance and an exit, means for mounting said chute on said bed to move from an operative position, wherein its entrance is disposed vertically below and adjacent said chuck, and an inoperative position, wherein its entrance is removed from below said chuck and is covered, means normally moving said chute to its inoperative position, means for automatically moving said chute to its operative position at the instant said cut-off tool finishes its cut-off stroke, and means on said chute for momentarily arresting the fall of said cut-off piece therethrough, said means including a door normally closing the exit of said chute and adapted to be locked shut during the time said chute is in its operative position, and means for releasing said door when said chute is moved to its inoperative position.

4. In a machine of the type described the combination with a machine bed, a chuck rotatably mounted on said bed, a cross slide mounted on said bed to reciprocate transversely of said chuck, a cut-off tool carried by said cross slide, driving means for said chuck and cross slide, control means for periodically connecting said cross slide to said driving means to cut off a piece of work held by said chuck, of a pick-off attachment for directing said piece cut off by said cut-off tool to a point remote from said chuck without injury to said piece, said pick-off attachment comprising an elongated chute having an open entrance and an exit, means for mounting said chute on said bed to move from an operative position, wherein its entrance is disposed vertically below and adjacent said chuck, and an inoperative position, wherein its entrance is removed from below said chuck and is covered, means normally moving said chute to its inoperative position, means for automatically moving said chute to its operative position at the instant said cut-off tool finishes its cut-off stroke, and means on said chute for momentarily arresting the fall of said cut-off piece therethrough, said means including a door normally closing the exit of said chute and adapted to be opened by the weight of a cut-off piece lying thereagainst, a projection on said door adapted to engage said bed when said chute is in its operative position to positively hold said door shut, and said projection adapted to be freed from engagement with said bed when the chute is moved to its inoperative position.

5. In a machine of the type described the combination with a machine bed, a chuck rotatably mounted on said bed, a cross slide mounted on said bed to reciprocate transversely of said chuck, a cut-off tool carried by said cross slide, driving means for said chuck and cross slide, control means for periodically connecting said cross slide to said driving means to cut off a piece of work held by said chuck, of a pick-off attachment for directing said piece cut off by said cut-off tool to a point remote from said chuck without injury to said piece, said pick-off attachment comprising a shaft rotatably mounted on said bed, an elongated chute having an open entrance and an exit connected to said shaft and having its entrance disposed adjacent said chuck, a shield on said bed below said chuck, a spring normally rotating said shaft in a direction to move the entrance of said chute beneath said shield so that metal chips from the stock will not fall thereinto, and means actuated by said control means for rotating said shaft in a direction to swing said chute from beneath said shield and into a position directly beneath said chuck the instant the cut-off tool finishes its cut-off stroke.

6. In a machine of the type described the combination with a machine bed, a chuck rotatably mounted on said bed, a cross slide mounted on said bed to reciprocate transversely of said chuck, a cut-off tool carried by said cross slide, driving means for said chuck and cross slide, control means for periodically connecting said cross slide to said driving means to cut off a piece of work held by said chuck, of a pick-off attachment for directing said piece cut off by said cut-off tool to a point remote from said chuck without injury to said piece, said pick-off attachment comprising an elongated chute having an open entrance and an exit, means for mounting said chute on said bed to move from an operative position, wherein its entrance is disposed vertically below and adjacent said chuck, and an inoperative position, wherein its entrance is removed from below said chuck and is covered, means normally moving said chute to its inoperative position, means for automatically moving said chute to its operative position at the instant said cut-off tool finishes its cut-off stroke, and a trough carried by said cross slide and located directly beneath said cut-off tool, said trough adapted to align with said chute when the same is in its operative position and form a passage for the cut-off piece between the chuck and the entrance of the chute.

LUTHER A. OESCHGER.